Sept. 19, 1961     M. J. CELOVSKY     3,000,147
CONTOUR GRINDER
Filed Oct. 2, 1958                                          6 Sheets-Sheet 1
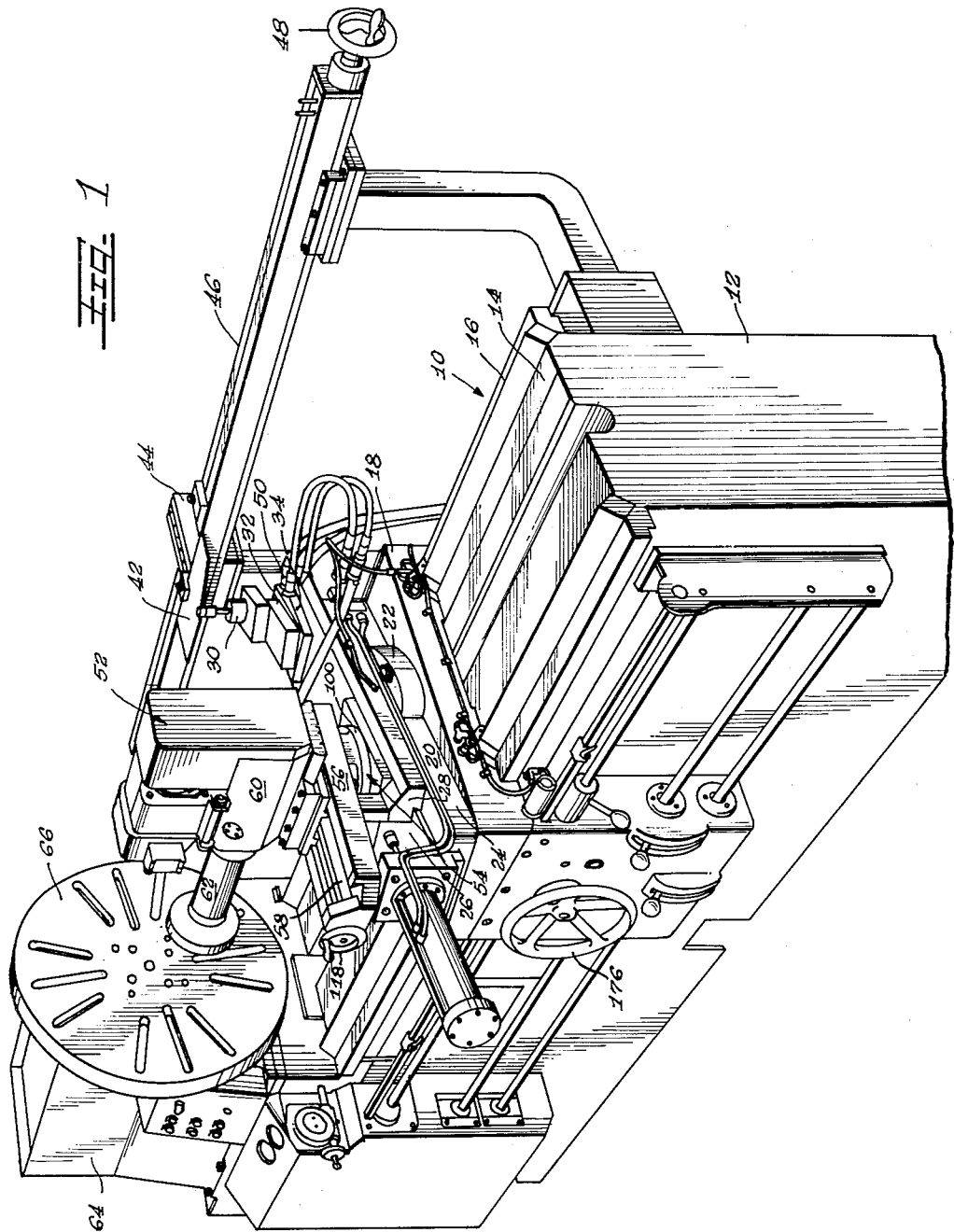
Inventor
Michael J. Celovsky

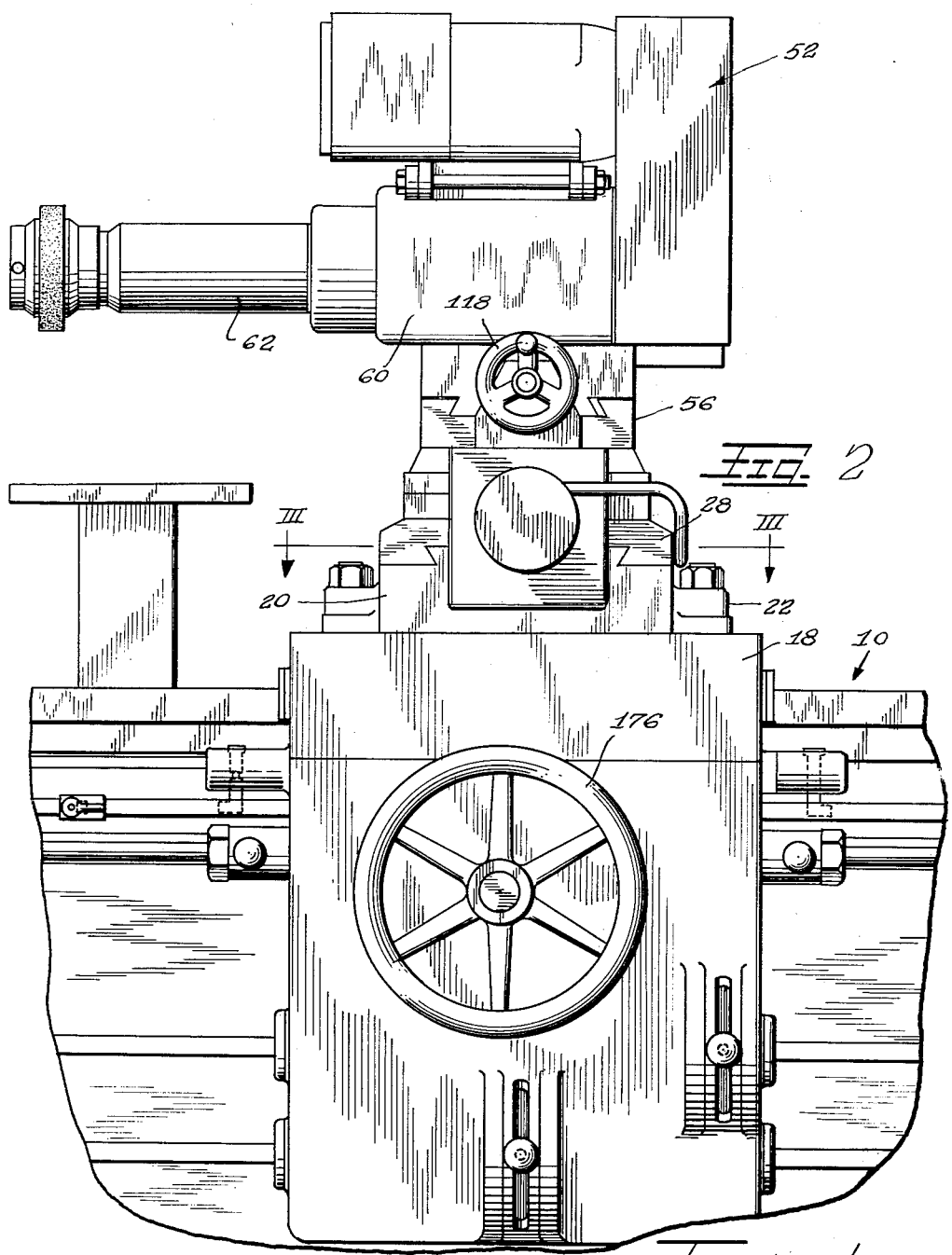

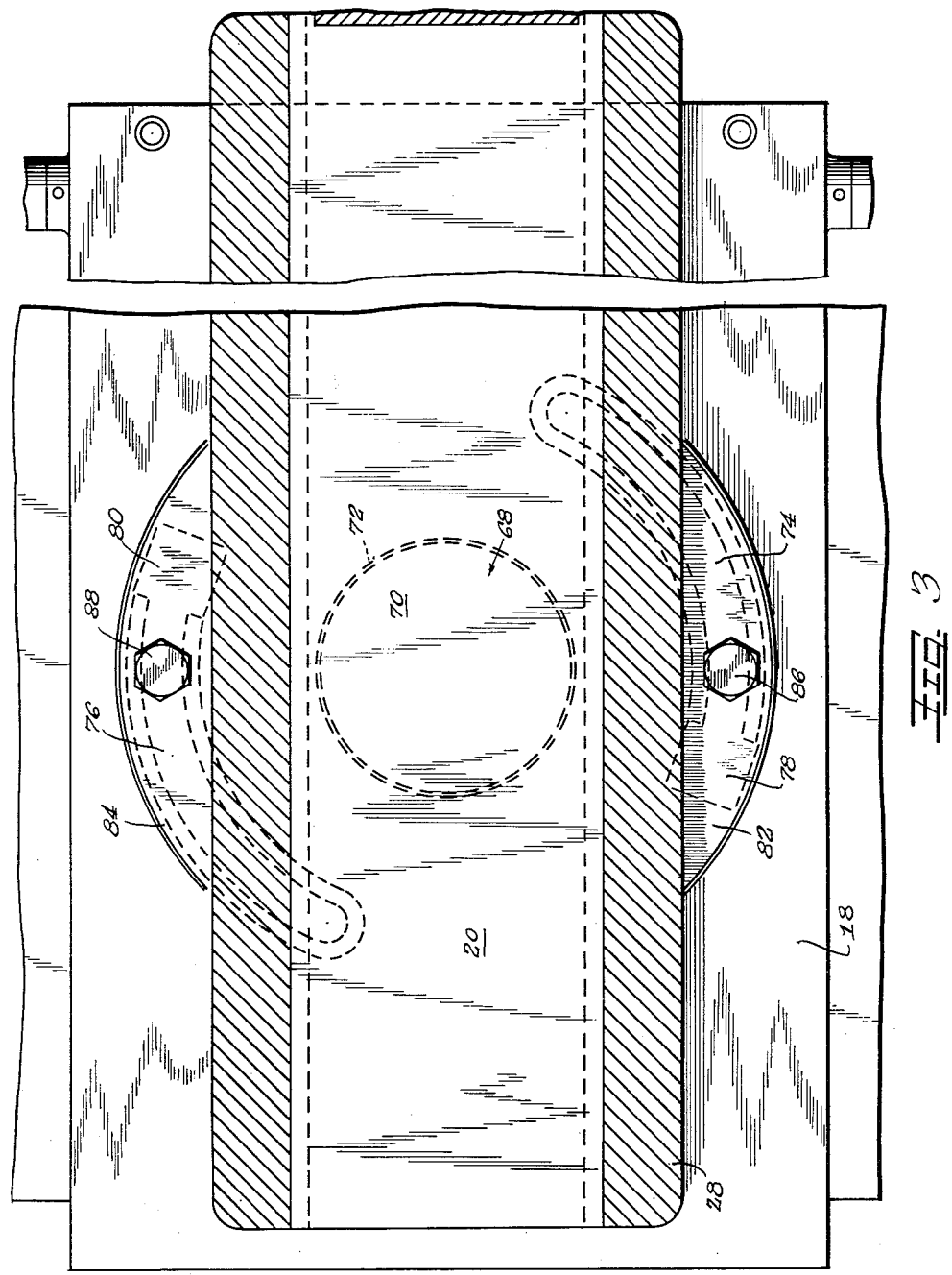

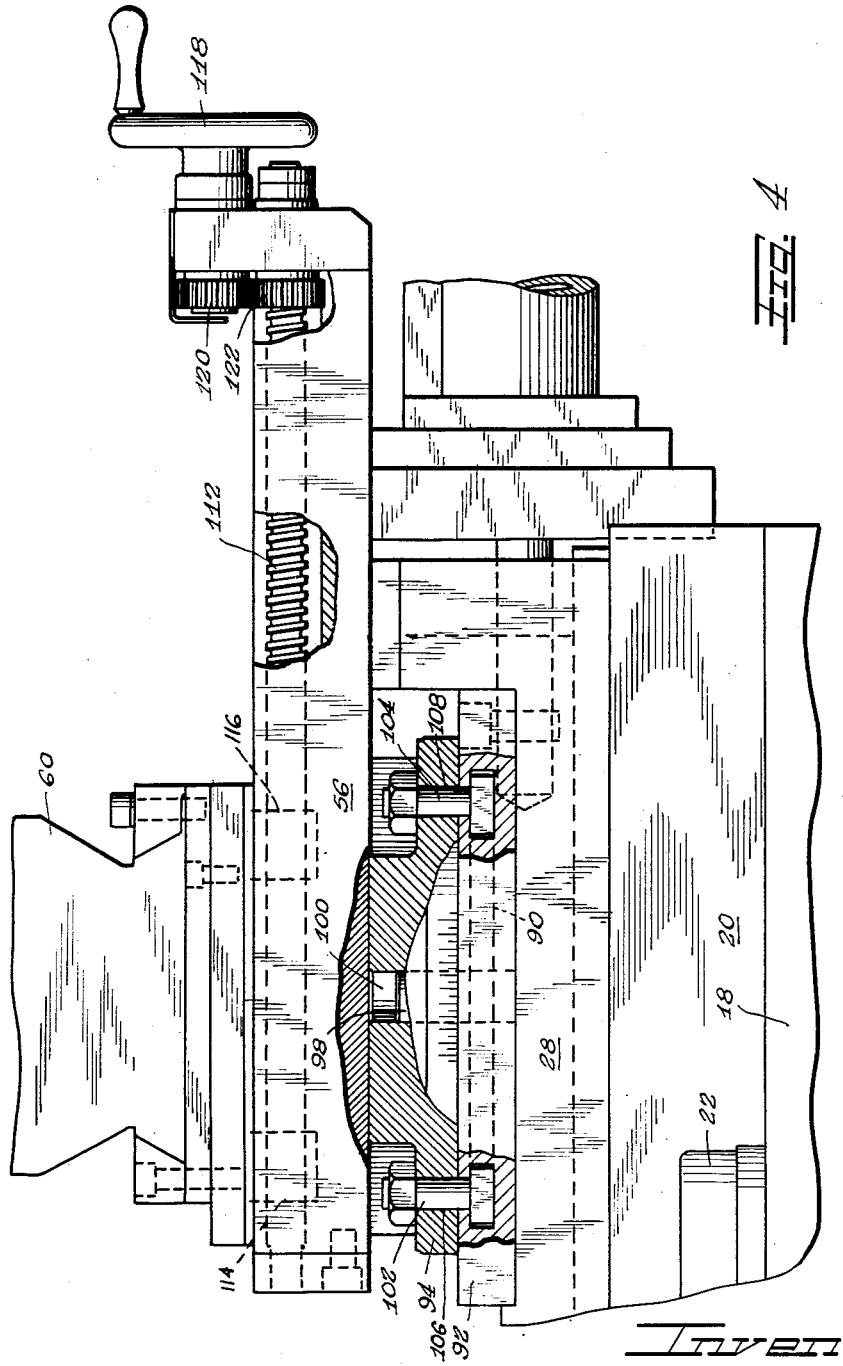

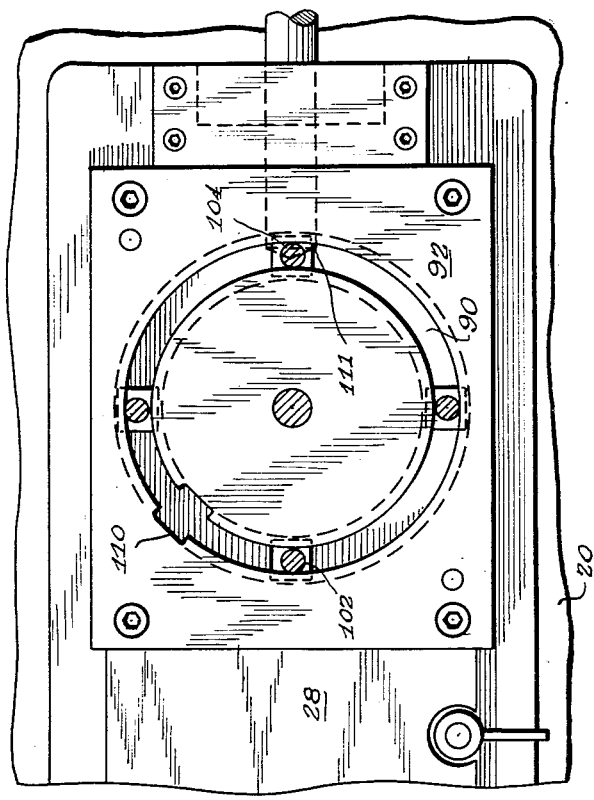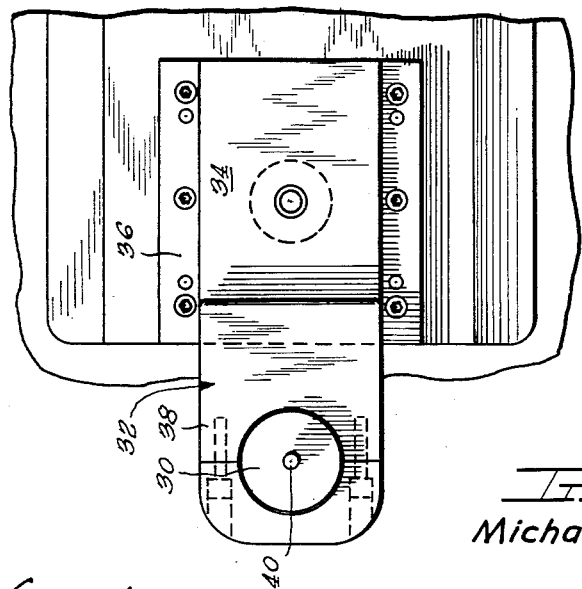

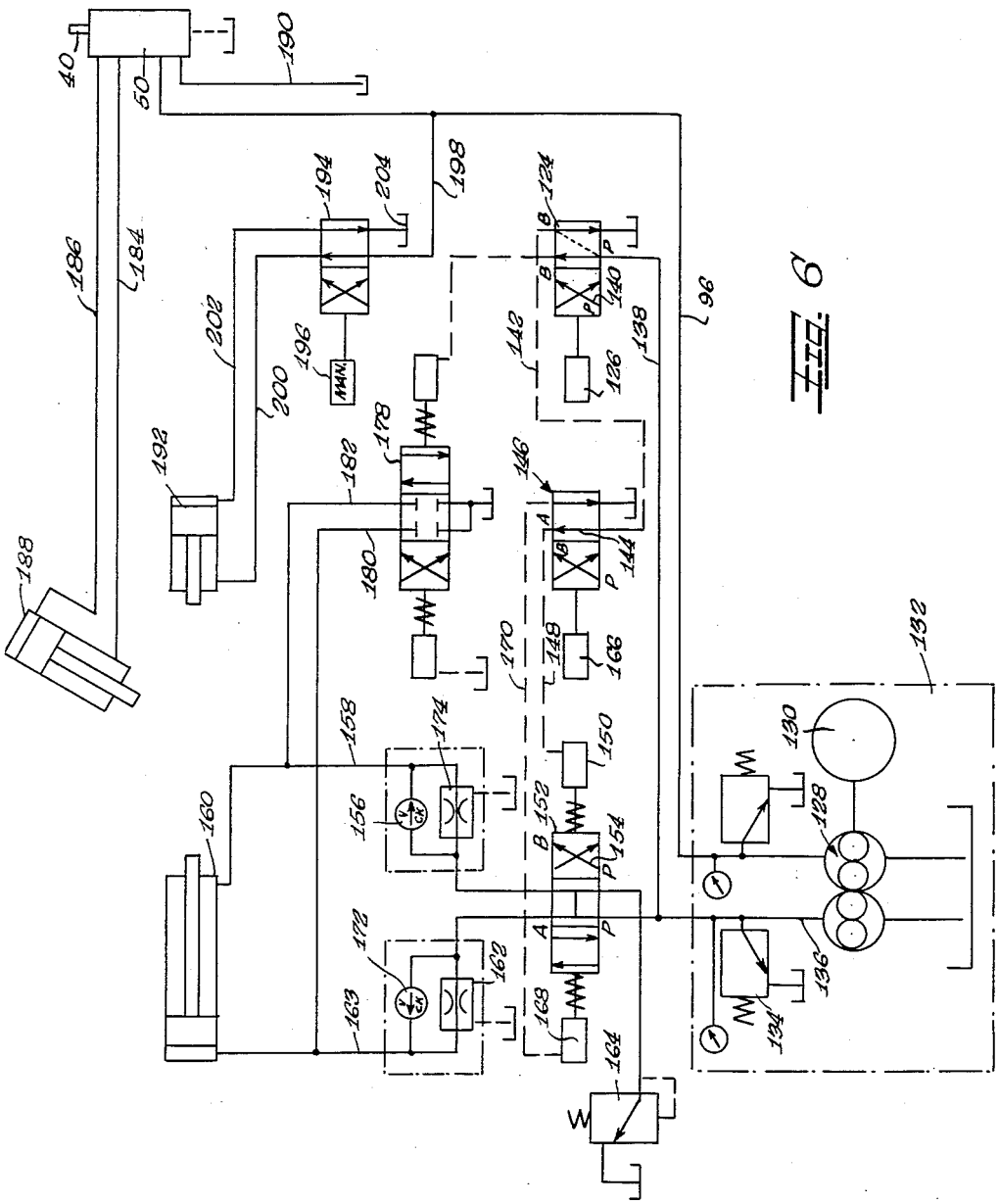

3,000,147
CONTOUR GRINDER
Michael J. Celovsky, Detroit, Mich., assignor to Industrial Tool Engineering Co., Detroit, Mich., a corporation of Michigan
Filed Oct. 2, 1958, Ser. No. 764,925
11 Claims. (Cl. 51—100)

This invention relates to grinders and more particularly to a contour grinder in which the tracer slide is swivel-mounted to afford angular adjustment through a predetermined range which will permit a cooperatively adjustable tracer head thereof to engage a template for continuous control of an adjustable grinder spindle assembly on the tracer slide, the grinder spindle assembly being reciprocated by hydraulic means which also energize the tracer slide.

Heretofore, limitations have existed on the extent to which contour grinding could be accomplished automatically. Thus movement of the tracer head parallel to the outline of certain contours on the template produced loss of pressure and "digging in" in conventional tracer controlled grinders, so that in order to maintain the requisite pressure on the tracer stylus it was necessary to perform finishing operations by hand-operated feed. In addition to the spoilage due to the grinder "digging in," the need for changing the job setup in some situations resulted in loss of production time.

Accordingly, it is an object of the present invention to provide a contour grinder which can be operated automatically for contours which previously required hand-finishing.

Another object of the invention is to provide a swivel mounted tracer slide in which the feed angle of the slide can be set to produce continuous pressure on the tracer stylus.

Another object of the invention is to provide a contour grinder wherein the tracer head is mounted on a tracer slide which can be angularly adjusted throughout a range which will permit substantially fully automatic operation, as described, and is preferably 60° to the left of the conventional position, and 15° to the right thereof.

Another object of the invention is to provide a contour grinder in which the tracer slide is energized hydraulically, the same source of hydraulic energy being used to reciprocate the grinder spindle assembly.

Another object is to provide a hydraulic control system for the grinder which automatically reciprocates the grinder spindle assembly.

Another object of the invention is to provide a contour grinder as described, in which the tracer head is positioned on a pivoted sliding mount at the end of the tracer slide to cooperate with the tracer slide in affording continuous pressure of the tracer head against a template used therewith.

Another object of the invention is to provide a grinder spindle assembly which can be moved through a relatively wide arc for adjustment in response to settings of the tracer slide on which it is carried, the assembly being slidable on its compound for a relatively large extent of axial adjustment.

Other objects and advantages of the invention will become apparent as the description proceeds in accordance with the drawings, in which:

FIG. 1 is a perspective view of a contour grinder according to the invention;

FIG. 2 is an enlarged front elevation of the contour grinder of FIG. 1, partly broken away;

FIG. 3 is a plan view taken through the lines 3—3 of FIG. 2, showing the swivel mounting for the tracer slide of the invention;

FIG. 4 is an enlarged fragmentary view, partly in section, of the adjustable mounting for the grinder spindle assembly of the invention;

FIG. 5 is a plan view of the mounting for the grinder spindle assembly, partly broken away, and disclosing the tracer head assembly; and FIG. 6 is a schematic showing of the hydraulic control system for the grinder of the invention.

As shown on the drawings:
Referring now to FIG. 1, a contour grinder 10 is shown, comprising a support table 12 whose upper surface 14 defines a guideway 16 on which a table 18 is slidably mounted for reciprocating movement controlled by hydraulic means as hereinafter described.

In conventional tracer controlled grinders, the tracer head does not receive the necessary control pressure, when the template contour is at certain angles to the normal path of the head, so that the grinder digs into the workpiece. The difficulty is overcome in the grinder 10 by a tracer slide 20 which is pivotally mounted on the table 18 for angular adjustment in a predetermined arc as determined by means of a swivel mounting designated generally by reference numeral 22 and hereinafter further described. The slide 20 includes a lower slide portion 24 which defines a way 26, on which is slidably disposed an upper slide portion 28 whose movement is hydraulically controlled by a tracer head 30.

The tracer head 30, as best seen in FIG. 5, is positioned on a pivoted sliding mount 32 including a lower portion 34 slidably received in ways 36, and an upper portion 38 pivotally mounted on the portion 34. The stylus 40 of the tracer head 30 is positioned for contact with a template such as the template 42, which is, in the embodiment shown, releasably held in a template holder 44 threadedly engaged in a guideway 46 for axial control by means of a wheel 48 having a threaded control rod (not shown) journalled in the guideway. The tracer head 30 is urged along the contour of the template 42, so that slight tilting in the stylus 40 controls a valve designated generally by reference numeral 50 to vary the setting of the tracer slide 20.

A grinder spindle assembly 52 is mounted on the upper tracer slide portion 28 by means of a pivot 54, which permits angular adjustment to compensate for the adjustment of the tracer slide 20 and the tracer head 30, as hereinafter further described, the assembly 52 including a compound 56 defining a guideway 58 and slidably receiving a grinder head 60 carrying a grinder spindle 62. The end portion of the table support 12 includes an upstanding work support structure 64 on which a workpiece 66 may be suitably mounted, as understood by those skilled in the art.

Referring now to FIGS. 2 and 3, the swivel mounting 22 of the invention is in a preferred embodiment thereof, adapted to afford an angular adjustment for the tracer slide 20 of 60° to the left and 15° to the right of the conventional fixed position of a tracer slide. This range of angular adjustment affords substantially fully automatic contour grinding in response to template patterns which ordinarily would require successive job setups or manual operation in finishing. The swivel mounting 22 comprises a vertical journal or pivot 68 in which a preferably upstanding bearing cylinder 70 is formed on the table 18 and received in a journal bore 72 in the slide 24. The table 18 also defines a pair of diametrically opposed guideways 74 and 76, each extending for a predetermined number of degrees around the bearing 70 and terminating in a substantially square recess 78 and 80 respectively. The slide portion 24 includes at its intermediate portion a pair of oppositely disposed semi-circular retaining bosses 82 and 84 each receiving a bolt or tracking means 86 and 88 having an enlarged end or head (not shown) adapted to be received in the recesses 78 and 80 to track in the guideways 74 and 76. It will be understood that the upstanding portion 70 may in fact be formed on the upepr slide portion 24, and that other variations in the construction of the pivot means are within the scope of the invention. However, the guideways 74 and 76 have an angular dimension such as to afford an adjustment of the tracer slide 20 which is sufficient to maintain continuous pressure for the tracer head 30 in each setting thereof, and for all paths that it may follow in relationship to the template 42. In the example shown, each of the paths 74 and 76 extends angularly for 75° around a common center, and once a suitable angle for the slide 20 has been selected by the operator, the slide may be locked by the nut portions of the means 86 and 88.

The tracer head 30 is, in a preferred embodiment, mounted for pivotal movement in a 100° arc, and a slide portion 34 thereof is adapted to move preferably as much as 3 inches within the guideway 36 to provide further adjustability in dealing with a specific pattern. Thus the operation of the valve 50 may be calibrated in accordance with the setting of the slide 20.

Referring now to FIGS. 4 and 5, the grinder spindle assembly 52 may be adjusted through an arc of as much as 180° by means of the swivel mounting 54, which comprises a substantially circularly extending guideway 90 defined in a bearing 92 on the upper slide portion 28, and the assembly has a substantially circular pivot base 94 journaled on the bearing 92 by means of a pivot pin 98 which is preferably received in a central recess 100 defined in each of the portions 92 and 94. A plurality of bolts, such as the bolts or tracking means 102 and 104 extend through complementary apertures 106 and 108 in the plate 100, the heads of the bolts being received through recesses such as the recess 110 into the guideway 90. When a suitable position has been determined, the nut portions of the means 102 and 104 may be tightened to lock the assembly 52 in position. In order to define a predetermined limit of angular adjustment, an abutment 111 is provided in the guide path 90, which is effective in accordance with the number and position of the bolts. In the preferred embodiment, a movement of 180° has been found sufficient to compensate for the settings of the tracer slide 20 and the head 40.

The compound 56 preferably affords substantially 12 inches of travel for the assembly 52, the upper portion 60 thereof being adapted to move along the guideway 58 by means of a threaded shaft 112 extending through a pair of internally threaded brackets 114 and 116 and controlled by a manually operable wheel 118 having suitable gears 120 and 122 associated therewith.

Referring now to FIG. 6, a hydraulic control system for the grinder 10 is shown in schematic form comprising a start and stop pilot valve 124 which is adapted to be moved to the right by manual operation of a control 126, to start the system. A pump means 128 which is energized by an electric motor 130 thereupon is enabled to pump fluid from a reservoir 132 past a pressure control means 134 and through lines 136 and 138 to a valve line or conduit 140 in the valve 124 which is normally held out of position with respect to the fluid feed. The fluid enters P and moves diagonally to B in conduit 140 so that the line 142 carries fluid to a conduit 144 of a cam operated valve 146. The fluid then goes to A in the valve 146 and through a line 148 to a hydraulic control 150 so as to move a hydraulic four-way balancing valve 152 to the left. Thereupon, fluid in line 136 enters a conduit 154 in the valve 152 at P and moves diagonally to B. This fluid passes through a check valve 156 in a line 158 to the rod end of the table cylinder 160, whereby to move the table 18 to the left. Fluid from the head end of the table cylinder 160 thereupon passes through the restricted orifice 162 in line 163 and again through valve 152 into the reservoir 164. When the cam 166 on the valve 146 moves the valve to the right, upon completion of the movement of the table, pressure from P is then connected diagonally to B and to the hydraulic control 168 on the left side of the valve 152, through line 170. This moves the valve 152 to the right and connects P straight through to A and thence through the check valve 172 to the head end of the table cylinder 160, thereby reversing the direction of the table 18 so that it will be moved to the right. Fluid from the rod end of the table cylinder 160 then passes through the restricted orifice 174 and again through the balancing valve 152 to the reservoir 164.

When the table is moved manually by the gear and rack means 176, a valve 178 is moved to the left by hydraulic control so as to connect each end of the cylinder 160 through the valve 178 by lines 180 and 182 thereby allowing free flow of fluid and free movement of the table in response to the gear means 176 shown in FIG. 1.

The pump means 128 also energizes the axial movement of the tracer slide 34 in the guide 36. Thus pressure exerted against the tracer pin 40 by the template 42 operates control valve 50 so that fluid moves through line 184 or line 186 to one end or the other of the tracer slide cylinder 188 in accordance with the contour of the template. A vacuum 190 is provided to prevent backup pressure on the valve 50, as will be understood by those skilled in the art. The tailstock of the grinder is controlled by a valve 194 which may be actuated manually at 196 to admit fluid from the line 198 which leads to the cylinder 192 through line 200 or line 202 as required, it being seen that the normal position of the valve permits entry of the fluid through line 200 to move the tailstock to the left, the excess fluid passing from line 202 into a reservoir 204. Rightward movement of the valve 194 affords entry of the fluid through line 202 and return through line 200 to the reservoir 204, so as to move the tailstock to the right.

There has thus been provided a hydraulically controlled contour grinder in which the tracer slide may be disposed at a desired angle to the template by the swivel mounting of the invention, so as to overcome the need for hand-feed grinding which is found in conventional grinders and to afford substantially fully automatic control. The constant pressure of the tracer on the template which is made possible by the swivel mounting permits operation of a hydraulic control system in a manner which assures accurate grinding as well as marked reduction in rejects.

Although I have herein set forth and described my invention with respect to certain specific principles and details thereof, it will be understood by those skilled in the art that these may be varied without departing from the spirit and scope of the invention, as set forth in the hereunto appended claims.

I claim as my invention:

1. A contour grinder comprising a table, a tracer slide, swivel means mounting said tracer slide on said table, a tracer head, a tracer head slide mounted for axially adjustable movement on said tracer slide, said tracer head being swivel mounted on said tracer head slide, a grinder spindle, a grinder spindle slide, said grinder spindle being slidably mounted on said grinder spindle slide, and swivel means mounting said grinder spindle slide on said tracer slide.

2. A contour grinder comprising a table, a tracer slide, swivel means mounting said tracer slide on said table, a tracer head, a tracer head slide mounted for axially adjustable movement on said tracer slide, said tracer head being swivel mounted on said tracer head slide, a grinder spindle, a grinder spindle slide, said grinder spindle being slidably mounted on said grinder spindle slide, swivel means mounting said grinder spindle slide on said tracer slide, a stylus tiltably mounted on said tracer head for engagement with a template, and means controlled by said stylus for controlling the position of said tracer slide and said grinder spindle.

3. An automatic contour grinder comprising a table, a tracer slide, a tracer head on said tracer slide, swivel means supporting said tracer slide on said table, said tracer head being pivotal on said tracer slide, a grinder assembly including a tailstock, slide means supporting said grinder assembly, swivel means supporting said slide means for said grinder assembly and mounted on said tracer slide, and means controlled from said tracer head for controlling the movement of said tracer slide and the tailstock of said grinder spindle.

4. An automatic contour grinder comprising a table, means slidably supporting said table, a tracer slide having a tracer head thereon, swivel means supporting said tracer slide on said table, a grinder assembly, means supporting said grinder assembly on said tracer slide for angular adjustment relative to said tracer slide, and means controlled from said tracer head for controlling said tracer slide.

5. An automatic grinder comprising a table, a tracer slide, swivel means supporting said tracer slide on said table to afford a predetermined extent of angular adjustment of said tracer slide, a grinder assembly, means adjustably mounting said grinder assembly on said tracer slide, and a tracer head on said tracer slide controlling the movement of said tracer slide and correspondingly controlling the movement of said grinder assembly.

6. An automatic contour grinder comprising a table, a tracer slide, swivel means supporting the tracer slide on the table, a grinder assembly, slide means for said grinder assembly, swivel means supporting said slide means for said grinder assembly on said tracer slide, means slidably supporting said table, and a tracer head on said tracer slide controlling the movement of said tracer slide and said grinder assembly and controlling the slidable movement of said table on said means slidably supporting said table.

7. An automatic contour grinder comprising a table, means for slidably supporting said table, a tracer slide having a lower portion and an upper portion slidably mounted on said lower portion, a tracer head on said tracer slide, swivel means for mounting said tracer slide on said table and hydraulic means for actuating axial movement of the upper portion of said tracer slide along the lower portion thereof in response to pressure against said tracer head.

8. A contour grinder comprising a table, means for slidably supporting said table, a tracer slide having a tracer head, swivel means pivotally supporting said tracer slide on said table including guide means affording a predetermined extent of angular adjustment for said tracer slide, first hydraulic means for actuating said tracer slide in response to pressure on said tracer head, second hydraulic means for affording reciprocating movement of said table on said support means and pump means for said first and second hydraulic means, said tracer slide being adapted to coact with said first hydraulic means in affording substantially uninterrupted operation thereof.

9. In an automatic contour grinder having a table and means for slidably supporting said table, a tracer slide having a tracer head, swivel means affording a desired angular position of said tracer slide relative to said table, hydraulic means for actuating said tracer slide responsive to pressure on said tracer head, hydraulic means for effecting reciprocating movement of said table, and a pump for energizing said first and second hydraulic means, said second hydraulic means including a table cylinder, a balancing valve adapted to admit fluid from said pump to one end of said cylinder in one position thereof and to the other end of said cylinder in another position thereof, said valve normally closing flow to said cylinder, and means for moving said balancing valve in one direction or the other in accordance with the position of said table cylinder.

10. In a hydraulic system for use in reciprocating the table of a contour grinder, a table cylinder having a piston connected to the table, a pump, a first valve adapted to admit fluid to one end or the other end of the cylinder, a second valve responsive to the position of the cylinder, means responsive to the position of the second valve for moving the first valve to one or the other of its said positions, said means being adapted to hold said first valve in a normally closed position, and means connecting said pump with said first valve, said second valve and said table cylinder.

11. An automatic contour grinder comprising a table, means for slidably supporting said table, a tracer slide, swivel means pivotally supporting said tracer slide on said table and affording a predetermined amount of angular adjustment of said tracer slide relative to said table, said tracer slide including a lower portion and an upper portion slidably mounted on said lower portion, a tracer head on the upper portion of said tracer slide, hydraulic means for effecting slidable movement of said upper portion on said lower portion including pump means, a tracer cylinder and valve means connecting one side or the other side of said cylinder with said pump in accordance with pressure against said tracer head, and hydraulic means for effecting reciprocating movement of said table on said supporting means and actuated by said pump, said second hydraulic means including a table cylinder, a balancing valve, a line between said balancing valve and each end of said table cylinder, check valve means for each of said lines permitting free flow to said cylinder and restricted flow from said cylinder, a line from said pump to said cylinder, a reservoir, a line between said reservoir and said balancing valve, a pilot valve, a line from said pump to said pilot valve, a cam operated valve, a line from said pilot valve to said cam operated valve, hydraulic means for moving said balancing valve in one direction, hydraulic means for moving said balancing valve in the other direction, a line connecting said cam valve with each of said hydraulic means for said balancing valve, said balancing valve having a normal position closing said first lines to said pump and said reservoir, said cam valve having an initial position connecting said line from said pilot valve with said first hydraulic means for said balancing valve and a position for connecting said line from said pilot valve to said second hydraulic means in response to the movement of said table, said pilot valve being manually operable to open said second line from said pump to said line from said pilot valve to actuate said balancing valve in said one direction, said balancing valve being then adapted to connect said first line from said pump to one of the other of said lines from said balancing valve to said cylinder in accordance with the direction to which it is moved by the hydraulic means therefor.

References Cited in the file of this patent

UNITED STATES PATENTS

| | | |
|---|---|---|
| 2,330,566 | Edmonds et al. | Sept. 28, 1943 |
| 2,333,985 | Clark | Nov. 9, 1943 |
| 2,389,224 | Wessman | Nov. 20, 1945 |

FOREIGN PATENTS

| | | |
|---|---|---|
| 496,591 | Great Britain | Dec. 2, 1938 |